United States Patent
Bourilkov et al.

(10) Patent No.: US 7,932,634 B2
(45) Date of Patent: Apr. 26, 2011

(54) FUEL CELL HYBRID POWER SUPPLY

(75) Inventors: Jordan T. Bourilkov, Stamford, CT (US); David N. Klein, Southbury, CT (US); John Rotondo, Shelton, CT (US); Andrew G. Gilicinski, Westborough, MA (US)

(73) Assignee: The Gillette Company, Boston, MA (US)

( * ) Notice: Subject to any disclaimer, the term of this patent is extended or adjusted under 35 U.S.C. 154(b) by 1218 days.

(21) Appl. No.: 10/382,106

(22) Filed: Mar. 5, 2003

(65) Prior Publication Data

US 2004/0174072 A1   Sep. 9, 2004

(51) Int. Cl.
*H02J 1/00* (2006.01)
(52) U.S. Cl. ......................................................... 307/46
(58) Field of Classification Search ....................... 307/46
See application file for complete search history.

(56) References Cited

U.S. PATENT DOCUMENTS

| | | | | |
|---|---|---|---|---|
| 5,140,229 A * | 8/1992 | Yagi et al. | ...................... | 315/307 |
| 5,309,082 A * | 5/1994 | Payne | ........................... | 323/270 |
| 5,515,257 A * | 5/1996 | Ishii | .............................. | 363/21.1 |
| 5,610,450 A * | 3/1997 | Saeki et al. | ...................... | 307/46 |
| 5,986,437 A * | 11/1999 | Lee | .............................. | 320/162 |
| 6,154,007 A * | 11/2000 | Shaver et al. | .................. | 320/116 |
| 6,320,358 B2 * | 11/2001 | Miller | ............................ | 323/222 |
| 6,590,370 B1 | 7/2003 | Leach | ........................... | 323/299 |
| 6,615,940 B2 * | 9/2003 | Morisawa | ..................... | 180/65.1 |
| 6,646,426 B2 * | 11/2003 | Terashi | ......................... | 323/285 |
| 2002/0175657 A1 | 11/2002 | Leboe | ........................... | 320/132 |
| 2003/0105562 A1 | 6/2003 | Hsiao et al. | ...................... | 701/22 |
| 2003/0155887 A1 | 8/2003 | Bourilkov et al. | ............. | 320/104 |
| 2004/0053090 A1 * | 3/2004 | Hanson et al. | .................. | 429/22 |
| 2004/0126632 A1 * | 7/2004 | Pearson et al. | .................. | 429/17 |
| 2005/0089734 A1 * | 4/2005 | Norimatsu et al. | .............. | 429/22 |
| 2005/0118468 A1 * | 6/2005 | Adams et al. | ................... | 429/22 |

FOREIGN PATENT DOCUMENTS

| | | |
|---|---|---|
| EP | 1 225 082 A2 | 7/2002 |
| GB | 2 281 642 A | 3/1995 |

OTHER PUBLICATIONS http://en.wikipedia.org/wiki/Primary_cell, 1 page.
http://tpub.com/neets/book1/chapter2/1a.htm, pp. 1-5.

* cited by examiner

*Primary Examiner* — Hal I Kaplan
(74) *Attorney, Agent, or Firm* — Fish & Richardson P.C.

(57) ABSTRACT

A hybrid power supply includes a switching type DC/DC boost type converter that receives energy from a fuel cell and is arranged to deliver the energy to a rechargeable cell, set to provide a fixed output voltage that is less than the full charge voltage of the rechargeable cell. The hybrid power supply includes a circuit including a fuel cell current control that senses fuel cell current, and controls in part operation of the converter to provide constant current discharge on the fuel cell side of the hybrid power supply.

19 Claims, 6 Drawing Sheets

FUEL CELL HYBRID POWER SUPPLY

BACKGROUND

This invention relates to powering of portable electronic devices.

Portable electronic devices are normally powered with either a primary or a rechargeable battery. Growth in the portable electronic device market, as well as, changes in usage patterns, has provided opportunities for rechargeable sources of power to power an electronic device. While primary batteries have a greater energy density, their internal resistance is larger, and primary batteries are less suitable in high drain (>0.2 C rate of discharge) electronic devices. Rechargeable batteries can handle large loads but do not have sufficient energy capacity for many applications.

SUMMARY

According to an aspect of the invention, a hybrid power supply includes a switching type DC/DC boost type converter that receives energy from a fuel cell and is arranged to deliver the energy to a rechargeable cell set to provide a fixed output voltage that is less than the full charge voltage of the rechargeable cell.

According to an additional aspect of the invention, a hybrid power supply includes a switching type DC/DC boost type converter that receives energy from a fuel cell and is arranged to deliver the energy to a rechargeable cell and a circuit disposed to control the switching type DC/DC converter. The circuit includes a resistor voltage divider coupled to the feedback input of the converter, selected to provide a fixed output voltage that is less than the full charge voltage of the rechargeable cell.

According to an additional aspect of the invention, a method of operating a hybrid power supply includes delivering energy from a primary cell to a rechargeable cell through a switching type DC/DC boost type converter at a fixed voltage that is less than the full charge voltage of the rechargeable cell.

One or more aspects of the invention may include one or more of the following advantages.

The arrangement includes a fuel cell and provides a power source having improved energy density. This benefit is provided in several ways such as allowing the fuel cell to operate at peak efficiency. The rechargeable battery and hybrid circuit handle load changes that normally take the fuel cell off of it's peak operation point. Thus, by moderating load changes seen by the fuel cell, the arrangement provides higher fuel use efficiency of the fuel cell since the fuel cell can operate closer to peak efficiency. In addition, pulsing operation of the hybrid circuit near the end of a discharge cycle (i.e., at end of fuel cartridge life) allows additional energy to be extracted from each fuel cartridge. Current pulsing operation that occurs at a deep discharge could be modified to enable catalyst reactivation. If the hybrid circuit delivers high voltage pulses to the fuel cell, after each current pulse is delivered from the fuel cell, a reactivation mechanism can be employed to remove CO build-up from the anode catalyst in the fuel cell. This would provide a power boost to the fuel cell, and further improve its effective energy density. Generally, the brief start-up time required for a typical fuel cell is masked by operation of the rechargeable battery. This also allows the fuel cell start-up sequence to be optimized for fuel efficiency, rather than speed of start-up. The hybrid configuration extends the time that a typical fuel cell can handle "hot swap" fuel cartridge exchange while running a device from seconds to minutes. For configurations of a fuel cell with a high capacity rechargeable battery, load following in highly variable power applications (e.g., telecom, laptop computer, etc.) would become practical for fuel cells.

Other advantages are that if the DC/DC converter is operated to provide a constant current drain from the fuel cell, the fuel cell will be less likely to produce a release of poisonous waste chemicals such as formaldehyde, as can occur with variable load operation of a direct methanol fuel cell.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
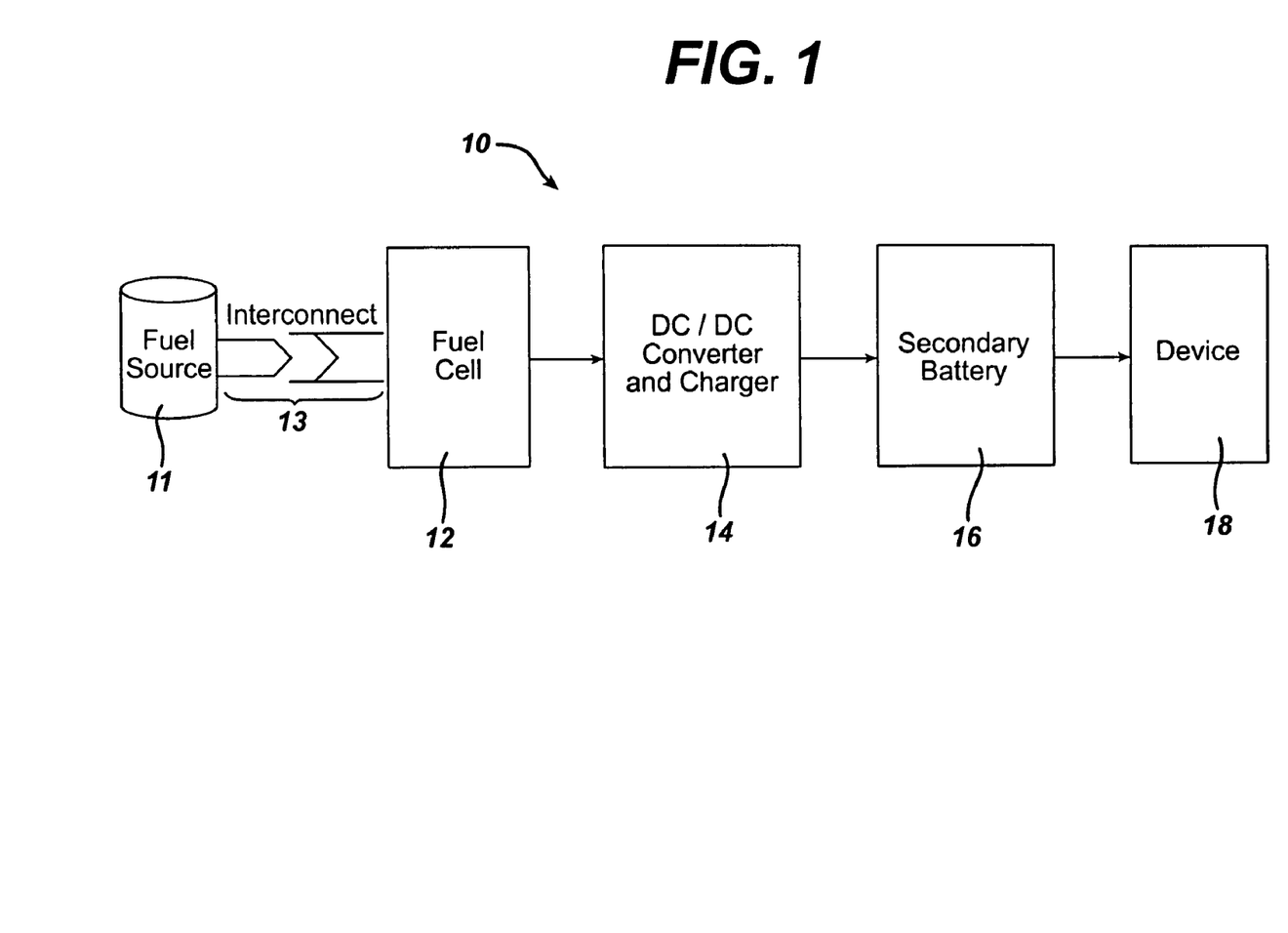
FIG. 1 is a block diagram of a fuel cell based hybrid DC power supply.

Referring to FIG. 1, a hybrid power supply 10 includes a switching type DC/DC boost type converter 14 that receives energy from a primary cell 12 and delivers the energy to a secondary, e.g., rechargeable cell 16. In one embodiment the primary cell 12 is a fuel cell and has a fuel cartridge 11 that supplies a source of fuel (a form of hydrogen) to the fuel cell 12.

The rechargeable cell 16 delivers power, as needed, to the device 18. The device 18 can be any type of electronic device, especially a portable device such as a wireless device, e.g., a cell phone, personal digital assistant, digital camera, and so forth. The switching type DC/DC boost type converter 14 is configured to provide a fixed output voltage that is less than the charging voltage of the rechargeable cell 16, and is current limited to a portion of the charging current of the rechargeable cell. In this configuration, the switching type DC/DC boost type converter 14 acts also as a charger for the rechargeable cell 16. The rechargeable cell 16 can be a rechargeable Li-Ion type. Preferred examples include a Li-Ion or Li-Polymer rechargeable cell. These rechargeable cells can provide power to a device 20 for relatively long periods of time compared to other potential rechargeable cells, and can be effective over long periods of continuous use.

Primary power sources 12 may include, but are not limited to alkaline, zinc-air, and fuel cells. In this embodiment a fuel cell will be discussed. The fuel cell 12 works like a battery. Fuel cells produce electricity and heat by reacting fuel (e.g., hydrogen) that is supplied to the cell with oxygen. A fuel cell includes two electrodes. One electrode is fed hydrogen whereas the other electrode is fed oxygen. Hydrogen atoms separate into protons and electrons in the presence of a catalyst. The protons and electrons take different paths to the cathode. The electrons go through an external circuit, producing a flow of electricity. The protons migrate through the electrolyte to the cathode, where they reunite with oxygen and the electrons to produce water and heat. Fuel cells have been proposed for various applications such as to power vehicles or to provide electricity and heat to buildings. Fuel cells are being developed for portable applications.

Different types of fuel cell technologies are under development and differ in terms of the electrolyte material and construction of the electrodes. Types of fuel cells include phosphoric acid fuel cells, which use phosphoric acid as the electrolyte, proton-exchange membrane fuel cells, which use a fluorinated sulfonic acid-based polymeric membrane as the electrolyte, and solid oxide fuel cells, which use a thin layer of zirconium oxide as a solid ceramic electrolyte. Other fuel cell types include direct-methanol fuel cells, which use a polymer membrane as an electrolyte. The direct-methanol fuel cell operates by direct oxidation of liquid methanol, eliminating the need for a fuel reformer. Another type of fuel cell is a molten carbonate fuel cell that uses a molten carbonate salt as the electrolyte. An alkaline fuel cell uses an alkaline electrolyte such as potassium hydroxide. Other types include regenerative or reversible fuel cells, which produce electricity from hydrogen and oxygen, but can be reversed and powered with electricity to produce hydrogen and oxygen.

Figure 2:
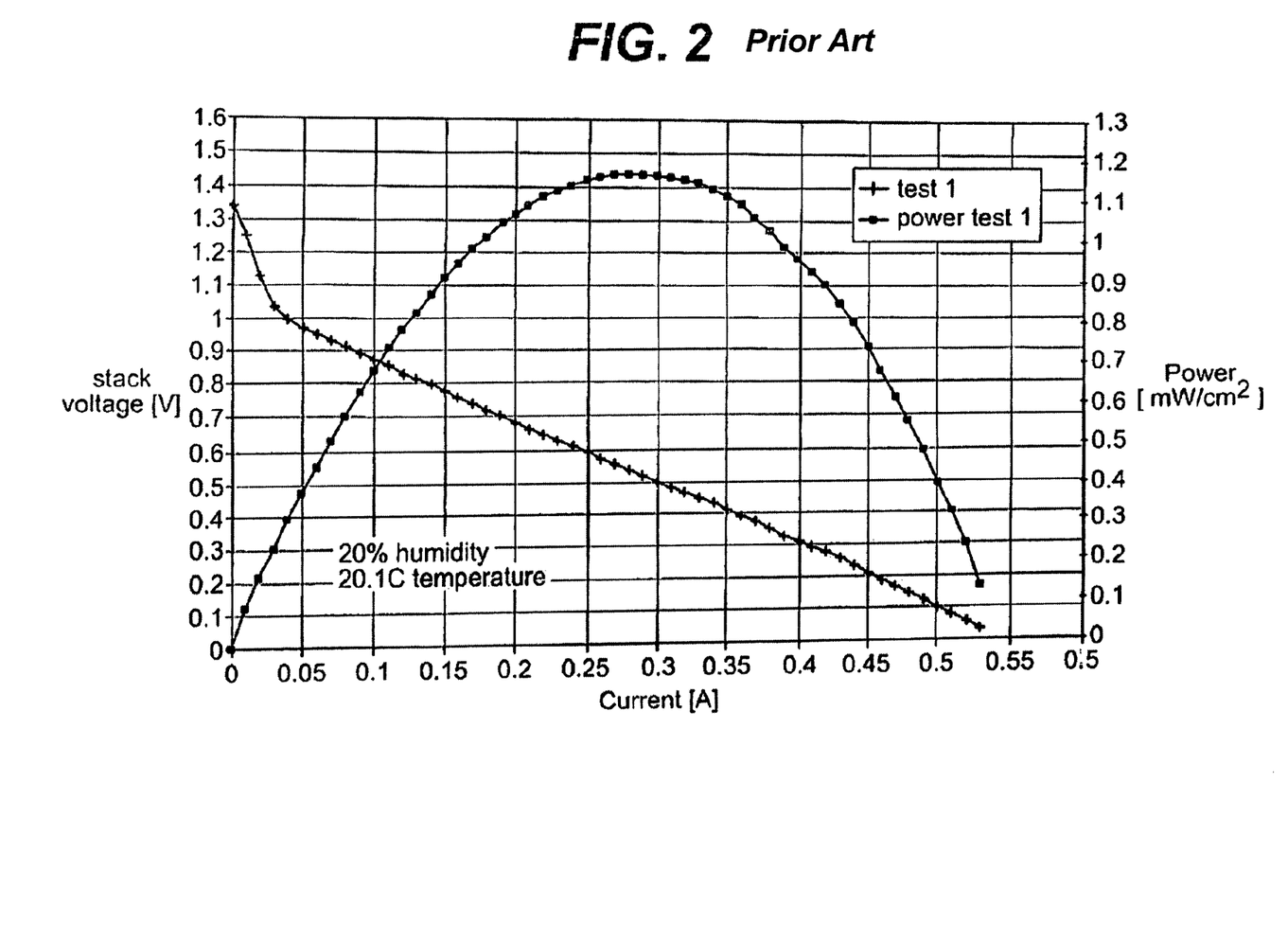
FIGS. 2 and 3 are plots depicting operating characteristics of typical fuel cells.

The effective energy density of a fuel cell is determined by its operating point. As an example, FIG. 2 shows a polarization curve for a direct methanol fuel cell. In this fuel cell operation at 300 mA provides peak power output of about 0.14 Watts with a stack voltage of about 1.45V. Typically, fuel cells have different net fuel efficiencies at different operating points. In a direct methanol fuel cell, for example, high current draws lead to high energy efficiencies due to a lower degree of parasitic processes such as methanol cross over (which leads to non-Faraday type reactions that consume the fuel without yielding power). In the example shown in FIG. 2, operation of the fuel cell to draw 300 mA yields a net fuel efficiency of 20%. That is, a 1 M/liter solution of methanol that should yield a theoretical energy density of 240 Wh/l (watt-hour/liter) for that amount of fuel would yield a practical energy density of only 48 Wh/l. With this efficiency a 100 cc fuel cartridge (2 "D" cells) of 1 M/liter methanol would provide about 1 hour of runtime for a 5 W electronic device. This type of fuel cell can have as low as 10% net fuel efficiency at operating points off its peak operating point. Thus, half of the fuel cell runtime could be lost if the fuel cell were operated at a non-optimized discharge condition when compared to operation at its optimal point.

Figure 3:
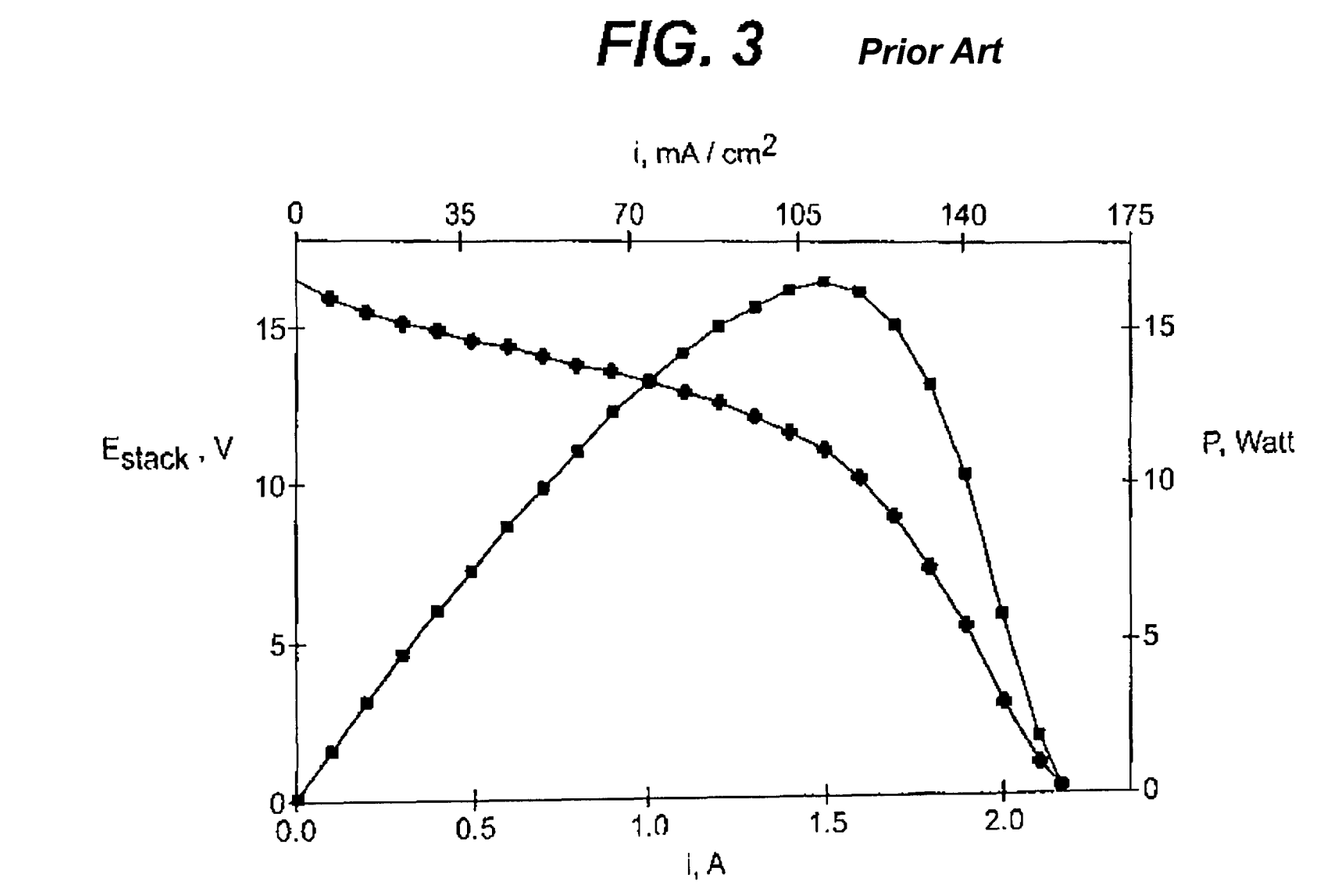

Referring to FIG. 3, operation characteristics typical of a hydrogen fuel cell are shown. The operation characteristics of a 15 W commercially available air breathing hydrogen fuel cell are shows that operation at 1500 mA provides a peak power output of about 15 W. As with the direct methanol fuel cell, a hydrogen fuel cell has different net fuel efficiencies at different operating points. In this case, lower currents allow for more leakage of hydrogen, resulting in changes in fuel efficiency at peak vs. below peak power. In a hydrogen fuel cell operation drawing 1 A yields a net fuel efficiency of about 70%, while operation at 250 mA provides a fuel efficiency of only 40%. Thus, a 100 cc fuel cartridge (2 "D" cells) with 3 grams of hydrogen (36 liters, stored via a chemical or physical means in the cartridge) would have a theoretical capacity of 105 Whr. Operation at peak efficiency for a 15 W notebook minicomputer would provide about 5 hours of operation, while running at ¼ peak operation current would yield under 3 hours. Almost half the runtime of the fuel cartridge would be lost if operating sufficiently off peak vs. at an optimal operating point.

By using Li-ion or Li-polymer rechargeable (secondary cells) batteries 16 the hybrid power supply 10 can take advantage of charging voltage characteristics of such rechargeable batteries. For example, the charge voltage of Li-ion batteries is conveniently related to their state of charge over a wide range. This allows the hybrid power supply 10 to produce an output voltage from the DC/DC converter 14 at a level that corresponds to a desired state of charge. For example, at a voltage of about 4V, the level is about 90% of the charge voltage. The DC/DC converter 14 does not fully charge the rechargeable battery 16, sacrificing 10% of the maximum continuous runtime of the device 20. But the non-fully charged arrangement provides the following advantages. The hybrid power supply 10 provides a higher energy efficiency operation for the rechargeable battery 16. At the end of charge of a rechargeable battery 16 heat losses are produced. By avoiding maximum charge such losses are avoided. Also the rechargeable battery 16 has a lower self-discharge rate (because of a lower charging voltage). In addition, there is minimization in damage from long-term storage. If the rechargeable battery 16 is stored at full charge, the Li-ion battery will permanently lose part of its capacity. Also the DC/DC converter 14 minimizes the need for a charge controller and protection circuit.

The hybrid power supply 10 also loosens accuracy requirements for the DC/DC converter circuit 14. Li-ion chargers have typically better than 0.5% accuracy in the output voltage. This typically requires a second charging device after the DC/DC converter. Without fully charging the Li-ion cell allows for a +/−2.5% voltage tolerance, from 3.9 to 4.1V, which is the output voltage accuracy typical of simple and inexpensive DC/DC converters 14. The DC/DC converter 14 eliminates potential to overcharge the Li-ion battery, resulting in a simplified protection circuit (not shown). The DC/DC converter 14 allows for a narrow voltage range at the device power supply terminal (which makes the device internal voltage regulation more efficient). The DC/DC converter 14 automatically compensates for the amount of energy used from the rechargeable battery 16 and provides a circuit having a very low quiescent current characteristic. The DC/DC converter 14 efficiently uses the fuel cell energy, has low electromagnetic interference (EMI) levels and can be integrated into existing Li-ion powered devices.

A charge requirement for Li-ion cells is to limit the charge current. The converter itself could limit the charge current. In this way, the step-up voltage converter acts also as a charger to the Li-ion battery, acting as a constant current source until the rechargeable battery voltage levels to the converter output voltage, and as a constant voltage source after this point. After the output voltage is reached, the current will drop exponentially to virtually zero in few hours. The system in this state drains negligibly low quiescent current (tens of uA).

Typical converters control the secondary (charging) current and keep the charging current at a constant level; other converters provide no current control. Constant current on the secondary side results in variable current on the fuel cell and increases as the voltage on the fuel cell decreases. This is a constant power type of discharge and is least favorable for a fuel cell. To avoid this the circuit includes the fuel cell current control, which senses the fuel cell current, and takes part in the closed feedback loop of the DC/DC converter, to assure a low constant current discharge on the primary side, greatly improving the fuel cell efficiency.

One drawback is the initial delay, needed for the Li-ion cell to get enough charge to operate the device, especially after replacing the fuel cell. A good solution is to monitor the fuel cell voltage in the device (through a fuel gauge, low-fuel warning and cutoff) and prevent further discharge of the secondary cell. In this way, when the fuel cell is discharged, and the rechargeable battery is still nearly fully charged, the device will prompt the user and eventually cutoff, and after replacing the fuel cartridge will be immediately ready to use. The rechargeable battery can be incorporated into the device and not be available to the user.

Figure 4:
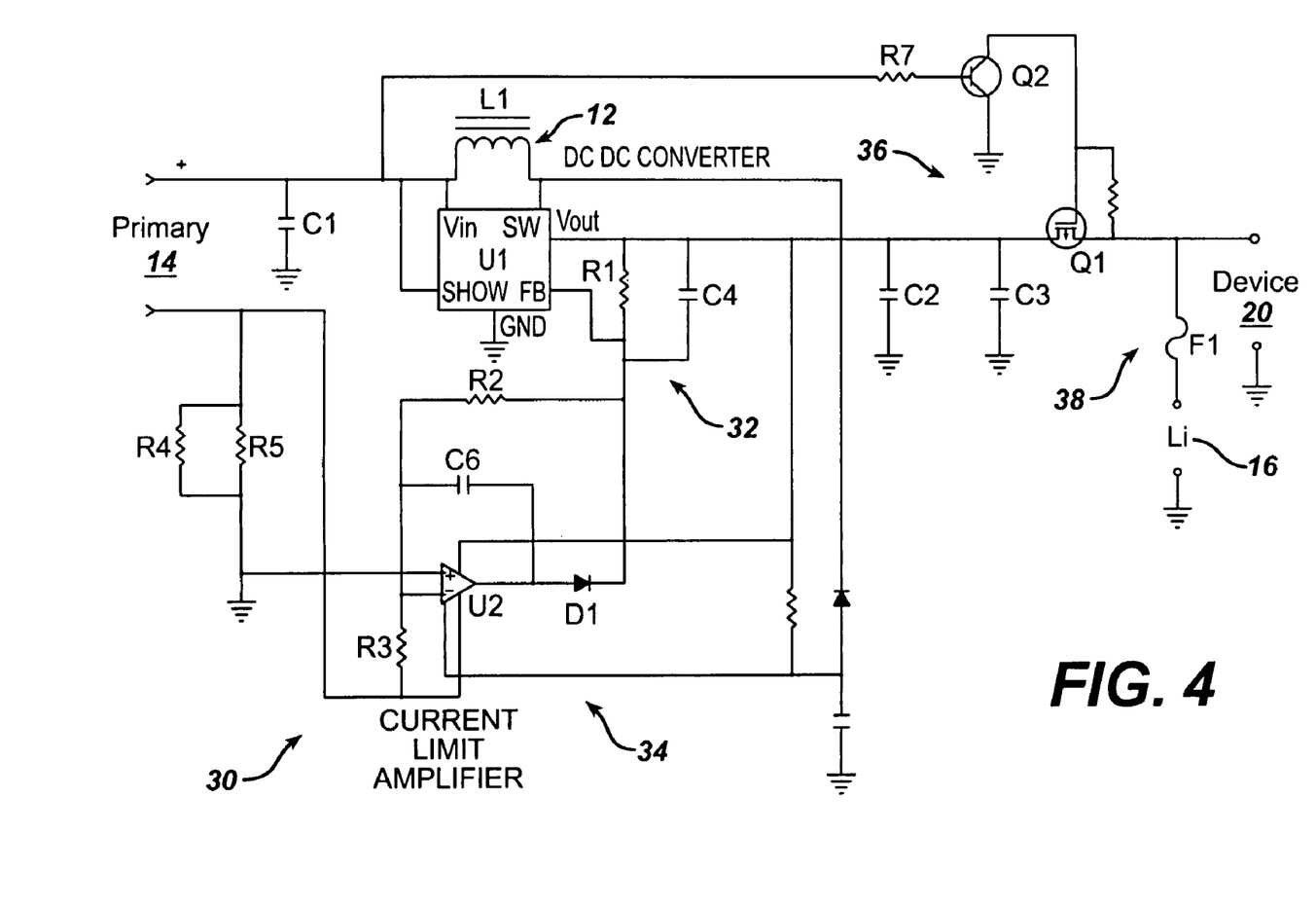
FIG. 4 is a schematic diagram of a control circuit for the hybrid DC power supply.

Referring to FIG. 4, a circuit 30 to control the operation of the step-up (boost) DC/DC converter 14 to provide optimal operation for the fuel cell is shown. The circuit 30 includes bias and control circuits 32 for the DC-DC converter 14, a primary current sense amplifier and a power shutdown 34 and a charge cutoff switch 36. In addition, fuse protection 38 is supplied. The circuit 30 is configured to draw a constant amount of current from the fuel cell such that the fuel cell can operate at its optimum operating point. In operation, the fuel cell delivers a constant current to the DC/DC converter 14. The DC/DC converter 14 delivers voltage to the rechargeable cell, which is either used to recharge the cell or deliver power to the load device 18.

The step-up (boost) DC/DC converter 14 can be for example, an LTC 3400 (U1) from Linear Technology. Many other devices could be used for example, the MAX 1765 from Maxim. The LTC 3400 (U1) has excellent efficiency (>90%) at low current levels, compared to about 80% or less for most other DC/DC converters. The biasing circuit 32 for the converter 14 includes an inductor L1 (e.g., 6.8 uh) coupled across the converter 14 at terminals $V_{in}$ and SW, which is optimized to improve conversion efficiency. The input voltage range of the step-up (boost) DC/DC converter 14 in this example is from 0.7 to 5.5V. The output voltage is adjustable via two external resistors, R1 and R2. The output voltage is adjusted on the feedback input (FB) of the converter 14 to equal an internal voltage reference (e.g., 1.25V), when the output voltage is 4V on output (Vout). The output voltage should remain higher than the input voltage for the converter 14 to operate normally. The limit on output voltage level to 4.0 volts thus limits the input voltage range in this particular implementation to 0.7-3.3V, which is applicable for two to four fuel cells in series. Should the input voltage exceed the output by more than 0.7V, the body diode (at terminal SHDW) within the DC/DC converter device will be forward biased and current will be transferred from the primary side to the secondary, limited only by the internal resistance of both batteries and the voltage difference between the two systems, resulting in a high inrush current.

The internal output current limit for this converter is 600 mA. A lower current limit, in the range 20-400 mA, is desirable to further improve efficiency and reduce size and cost. Ideally, the circuit 14 could be an ASIC, incorporating most of the external components (probably except the inductor L1 and the current sensing resistor, which can be used to program externally the primary current for the specific application). The capacitors $C_1$, $C_2$ and $C_3$ are used to filter switching pulses at the input and output of the converter 12 and prevent oscillations. C4 is used for "soft start" of the converter and to improve stability.

The circuit 30 has primary current sensor/amplifier with power shutdown section 34 including an operational amplifier U2 having resistors $R_4$ and $R_5$ to provide a primary current sensing resistor. The value of resistors $R_4$ and $R_5$ is a very low value to provide a minimum voltage drop or (IR losses) across the resistor $R_5$ (e.g., 0.25 ohm at 100 mA). The very low (25 mV average) IR drop is amplified 50 times by the operational amplifier $U_2$, whose gain is set by the $R_2/R_3$ ratio to reach 1.25V at the output of a diode $D_1$, connected to the converter 12 feedback input FB. In this way, the output voltage signal across R1, and the input current signal, coming through the diode D1, are summed at the converter's feedback input, without interference in-between, on a "largest-only" basis, and compared to the internal reference voltage. The system reacts to whichever of the signals first reaches 1.25V, and stops the converter switching, thus reducing the output voltage. This provides a simultaneous constant output voltage/constant input current type of battery charging source.

The output voltage is limited to 4V, and the output current is also limited to: $I_{out} = I_{in} \times V_{in} V_{out}$, which turns this voltage converter into a Li-ion charger, where CV/CC (constant voltage/constant current) output is required. Usually the Li-ion chemistry requires V=4.1V or 4.2V, and I<1 Coulomb rate (1C) rate. In a hybrid power supply 10, V=4V and I<<1C rate, which is much safer and may not require an additional protection board. If abnormal conditions are anticipated, redundant protections should be used. For example, applying higher voltage, e.g., more than 3.3V loaded, or more than 4.3V open circuit voltage, at the fuel cell terminals may be unsafe for the system described above.

As the operational amplifier $U_2$ drains a few tens of microamps, when powered, a power-save shutdown mechanism is implemented in order to reduce the quiescent current of the system, using the shutdown pin of the operational amplifier $U_2$. When the converter 12 is active and switching, the pulses through the diode $D_2$ will decrease the voltage on the shutdown pin of the operational amplifier $U_2$ sufficiently to enable the operational amplifier U2, and when idle, current through the pull-up resistor $R_8$ will charge the capacitor C5 and cut-off power to the operational amplifier U2.

The circuit 30 also includes a switch circuit 36. The Li-ion cell is connected to the output of the DC/DC converter 14 through the MOS FET (metal oxide semiconductor field effect transistor) switch Ql. The switch circuit 36 prevents discharge (several milliamps) of the Li-ion cell through the output of the DC/DC converter 14, when the fuel cell during discharge reaches the cutoff voltage on the DC/DC converter 14 input side. The switch circuit 36 could also be used to tune the system primary cutoff voltage to a desired level for 2 to 4 fuel cells in series of the selected type. The charge switch circuit 36 cuts off before the converter 14 input cutoff voltage is reached. The example shown is for two to four methanol fuel cells stack implementation. MOSFET Q1 is biased through the emitter-collector junction of the bipolar transistor Q2, and the base-emitter junction of the last is biased through R7 from the fuel cell. When the primary voltage drops under about 0.7V, Q2 is off and turns off Q1, stopping the charge. The resistor R6 sinks the leakage current through Q2 when open to prevent it from biasing the high-impedance gate of Q2. As turning the charge "off" removes the load from the converter output Vout and hence from the fuel cell, the voltage of the last increases and charging resumes, then the circuit 36 is activated again, thus switching until all available energy of the fuel cell for the chosen cutoff voltage is transferred to the rechargeable battery 16. This approach distinguishes from other approaches, as normally a device will cut off when the cutoff voltage of its power source is reached for the first time, and some amount of energy will remain unused in the fuel cell. The current approach allows the fuel cell to deliver all of its energy prior to termination. The Li-ion battery has a fuse circuit 38 with fuse (F1) in series with both the charge path and the output, used for safety, to permanently open in case of a short-circuit condition.

There are several parameters to optimize when designing a hybrid power system. For example, the energy of the fuel cell 12 is optimized to cover the desired total runtime of the device. The energy of the rechargeable battery 16 is optimized to cover the desired continuous runtime of the device for 1 cycle. The power of the rechargeable cell is selected to be adequate for the device peak power and the charge rate is optimized to allow nearly full fuel cell use to satisfy a desired intermittent performance of the device.

In many devices 20, a smaller than originally specified size Li-ion battery can provide the necessary peak power, and due to the permanent charging, may be sufficient for satisfactory continuous performance.

The charging technique described is based on a voltage boost converter that works when the input voltage is lower than the output voltage. The internal switching transistor (in the DC/DC converter) has a diode that is forward biased and starts conducting directly from input to output (without current limit), if the input voltage exceeds the output voltage by about 0.2-0.4V. The Li-ion rechargeable cell has a typical discharge voltage range from 4.2V down to 3.2V. A protection circuit, cutting off at 2.4V is incorporated in the battery to prevent degradation of the Li-ion cell. If the circuit is designed such that the load (device) cuts off at 3.2 V, the input load voltage will never exceed 3.3V (2 to 4 fuel cells in series).

It is possible to design a hybrid power supply using higher input than output voltage by replacing the step-up (boost) converter with a step-down (buck) DC/DC converter. This is less desirable because multiple cells in series have lower energy density than one or two large cells with the same volume. Cell voltage balancing can be a problem with the multiple cells in series and could be more difficult and expensive to refuel. For fuel cells applications, 8-20 cells would be needed for the step-down variation.

Figure 5:
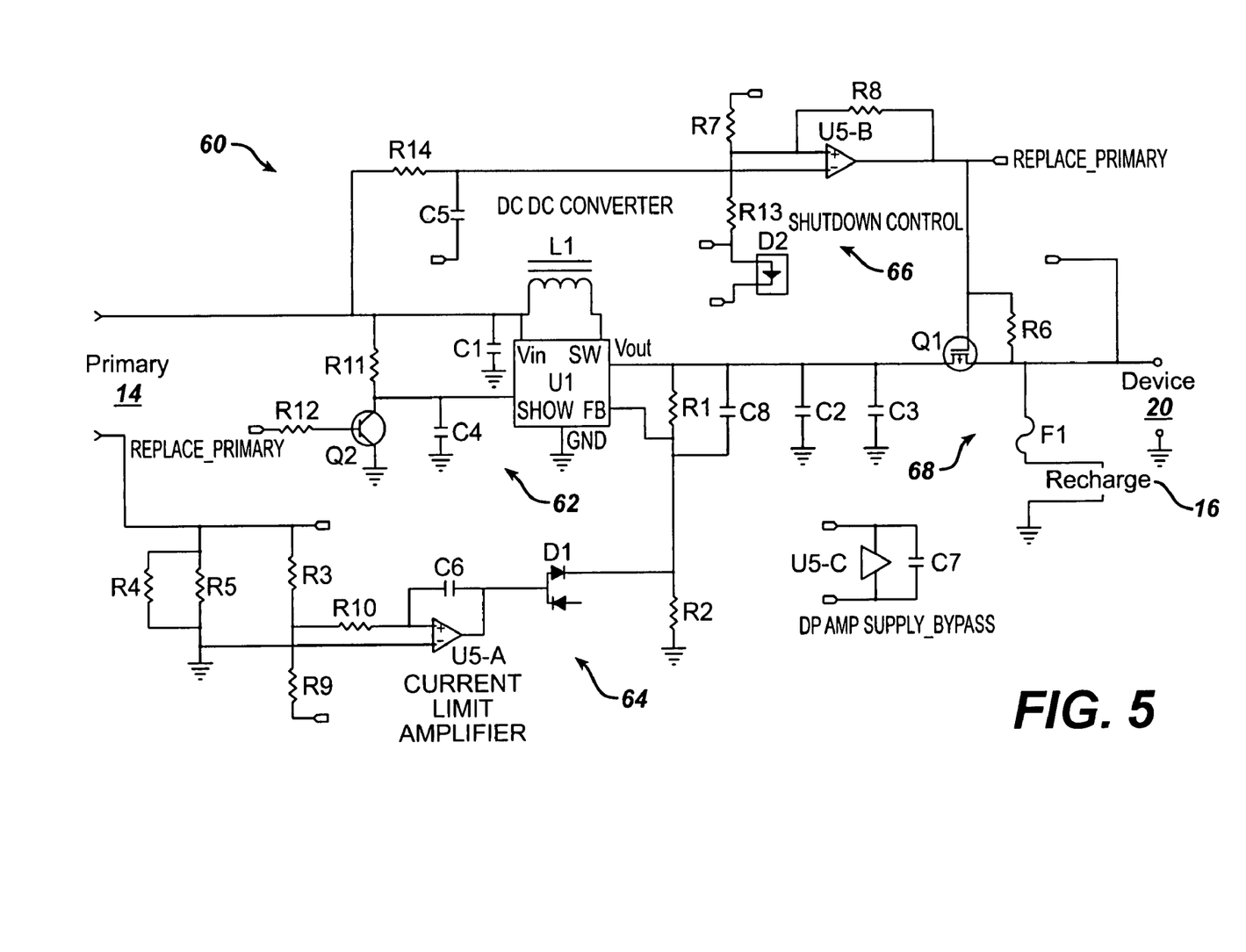
FIG. 5 a schematic diagram of an alternate control circuit for the hybrid DC power supply.

Referring to FIG. 5, an arrangement of a step-up (boost) DC/DC converter circuit 60 is shown. The circuit 60 includes bias and control circuits for the DC-DC converter 14, a primary current sense comparator 64 and a charge cutoff comparator 66, connected to a power shutdown circuit 62. In addition, fuse protection 68 is supplied. The circuit 60 is configured to draw a constant amount of current from the fuel cell such that the fuel cell can operate at its optimum operating point. In operation, the fuel cell delivers a constant current to the DC/DC converter 14. The output of the DC/DC converter 14 is connected to the rechargeable cell, which is either used to recharge the cell or deliver power to the load device 20.

The step-up (boost) DC/DC converter 14 can be for example, the LTC 3400 ($U_1$) from Linear Technology. Many other devices could be used, for example, the MAX 1765 from Maxim, as mentioned above. The external components for the converter 14 include an inductor $L_1$ (e.g., 6.8 uh) coupled across the converter 14 at terminals $V_{in}$ and SHDW with bypass capacitor $C_4$, which is selected for optimal conversion efficiency. The input voltage range of the step-up (boost) DC/DC converter 14 in this example is from 0.7 to 5.5V. The output voltage is adjustable via two external resistors, $R_1$ and $R_2$. The output voltage is adjusted on the feedback input (FB) of the converter 14 to equal an internal voltage reference (e.g., 1.25V), when the output voltage is 4.0V on output (Vout). The output voltage should remain higher than the input voltage for the converter 14 to operate normally. The minimum output voltage of 3.2 volts thus limits the input voltage range in this particular implementation to 0.7-3.3V, which is applicable for two to four fuel cells in series. Should the input voltage exceed the output, current will be transferred directly from the primary side to the secondary, limited only by the internal resistance of the fuel cells and the Li-ion battery, resulting in a high inrush current. Capacitor $C_7$ and op amp U5-C provide OP Amp supply bias.

As above, a lower internal output current limit of the DC/DC converter 14, in the range 20-400 mA, is desirable to further improve efficiency, and reduce size and cost. This could be provided by an ASIC, incorporating most external components (probably except the inductor $L_1$ and the current sensing resistor, which can be used to program the primary current value for the specific application). The capacitors $C_1$, $C_2$ and $C_3$ are used to filter the switching pulses at the input and output of the converter, and prevent oscillation. The capacitor $C_8$ $C_{18}$ is used to assure "soft start" of the DC/DC converter.

The circuit 60 includes a primary current sensor/comparator, and power shutdown section 62, including an operational amplifier U5-A (one operational amplifier of a dual packaged op amp pair), having resistors $R_4$ and $R_5$ to provide a primary current sensing resistor, which should have a very low value for minimum voltage drop (or IR losses) across the resistors $R_4$ and $R_5$ (e.g., 0.25 ohm at 100 mA). The very low (25 mV average) IR drop is compared to a reference voltage (produced by the reference voltage source D2 and the voltage divider $R_7/R_{13}$) by the operational amplifier U5-B, whose output will go high and cut off the converter, when the primary current exceeds the preset limit. The resistor $R_{10}$ and the capacitor $C_6$ connected in the negative feedback loop of the operational amplifier U5-A, form an integrator to introduce a delay and thus stabilize the comparator's response. The diode D1 prevents interference between the voltage control and the current control circuits. In this way, the output voltage signal, coming through $R_1$ and the input current signal, coming through the diode D1, are summed at the converter's feedback input, without interference in-between, on a "largest-only" basis, and compared to the internal reference voltage. The system reacts to whichever of the signals first reaches 1.25V, and stops the converter 14 from switching, thus reducing the output voltage.

The Li-ion cell is connected to the output of the DC/DC converter 14 through the MOS FET (metal oxide semiconductor field effect transistor) switch $Q_{11}$. The shutdown control circutit 66 prevents discharge (several milliamps) of the Li-ion cell through the output of the DC/DC converter 14, when the fuel cell during discharge reaches the cutoff voltage on the DC/DC converter input side (in this example 1.4V for four to six fuel cells in series). it could also he used to tune the system primary cutoff voltage to a desired level for the selected fuel cell type. The shutdown circuit 66 via $Q_{11}$ cuts off before the converter input cutoff voltage is reached. MOSFET $Q_{11}$ is biased through the output of an Op Amp U5-B that is used as a comparator to sense, via resistor $R_{24}$, when the input voltage to the DC-DC converter 12 is below a certain threshold. The threshold voltage is determined b resistors $R_{17}$, $R_{23}$, and Zener diode D2. In this example, hysteresis is introduced by the use of $R_{18}$ in the U5-B negative feedback loop. If V is 1.40 volts or less, the converter is shut down through the inverter circuit 62, formed by the transistor $Q_{12}$ and the charge is cut off via $Q_{11}$, preventing discharge of the Li-ion cell through the converter output. If V is 1.45 volts or more, the DC/DC converter is "on" and the circuit is charging. A signal "Replace fuel cartridge" is asserted when the input voltage is below 1.4V and is used to drive $Q_{11}$ and $Q_{12}$. When the primary voltage drops under about 1.4V, $Q_2$ is off and turns off $U_1$ stopping the charge. The resistor $R_{16}$ sinks the leakage current at the high impedance gate of $Q_{11}$, when open, to prevent biasing. Turning the charge "off" removes the load from the converter output $V_{out}$ and hence front the fuel cell, and the voltage of the fuel cell recovers, turning the charge "on" again. The switching and hence charge will continue at attenuated duty cycle until all available energy of the fuel cell for the chosen cutoff voltage is transferred, as above. Caption "DP AMP SUPPLY BYPASS" shows an Op Amp U5-C, an extra Op Amp in a package that includes Op Amps U5-A and U5-B bypassed by a capacitor $C_7$.

The Li-ion battery 16 has a fuse circuit 68 with fuse ($F_1$) in series with both the charge path and the output, used for safety, to permanently open in case of a short-circuit condition.

Pulsed charging at deep discharge, and a voltage pulsing which allows anode catalyst re-activation, would both contribute to further expanding the advantage for the hybrid power supply 10 configuration vs. the fuel cell only power source.

Figure 6:
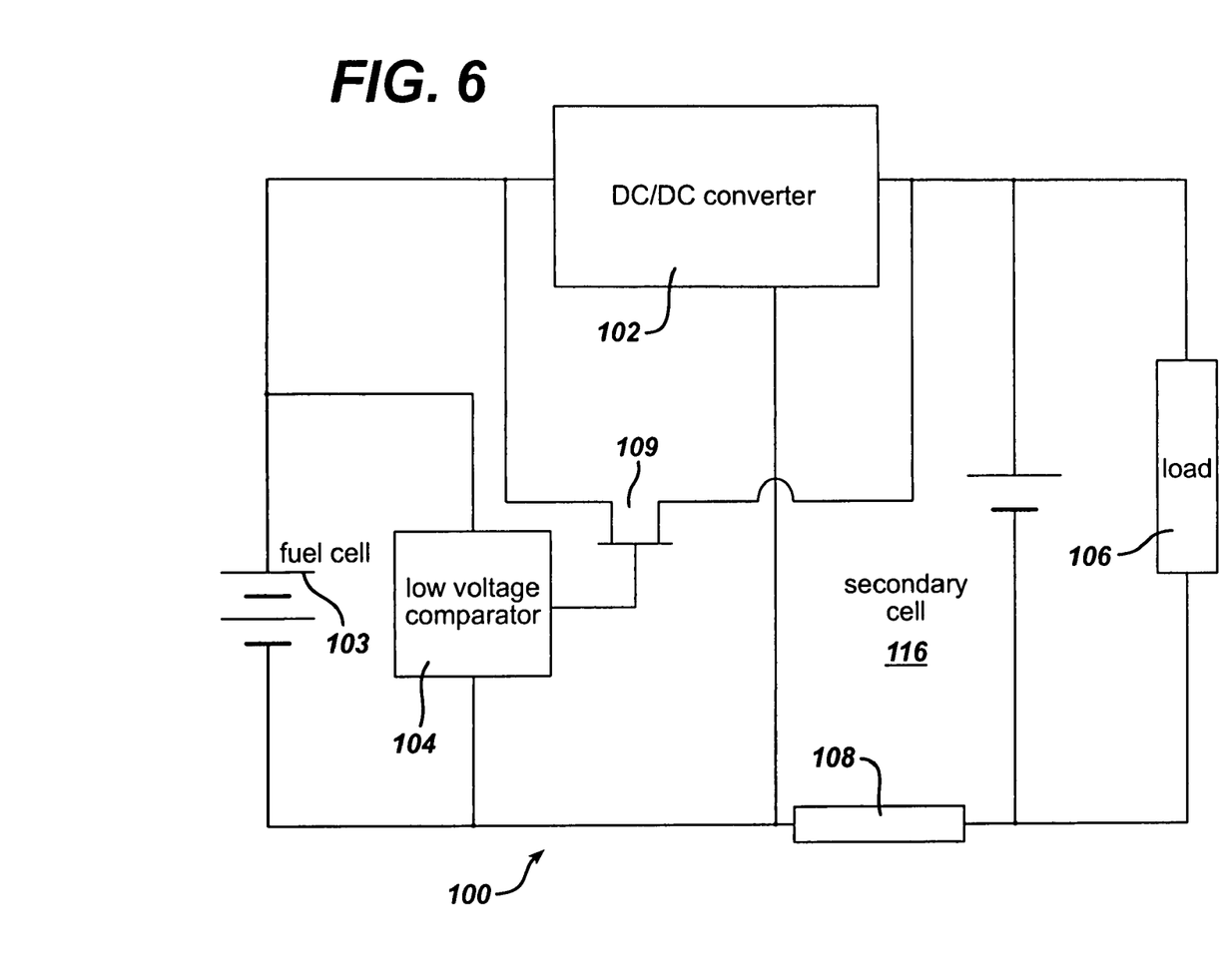
FIG. 6 is a schematic diagram depicting a circuit used to regenerate a fuel cell.

Referring to FIG. 6, another aspect of increasing runtime has to do with the ability of the arrangement to achieve catalyst reactivation in the fuel cell 12. As shown in FIG. 6, an hybrid power supply 100 includes a "reversible DC/DC converter" 102 having a switching transistor 109 coupled between input and output terminals of the DC/DC converter 102. The switching transistor (here a FET although other devices can be used) is controlled from a low voltage detection comparator 104. The switching transistor allows a reconfiguration of output and input terminals of the DC/DC converter enable current pulses to be supplied to the fuel cell 103 input according to the state of the voltage on the fuel cell 103 as determined by the comparator 104. The fuel cell 103 is coupled with the low voltage detection comparator 104 that detects when the fuel cell voltage drops below a predefined value. A current sensing shunt resistor 108 (low value of e.g., 0.1 ohms is coupled to sense the fuel cell 103 discharge current and is coupled between the negative terminals of the fuel cell 103 and rechargeable, e.g., Li-ion, battery 116. When the voltage of the fuel cell 103 drops below the predefined value the comparator 104 causes a signal to be fed to the input (gate) of switching transistor 109 to switch the transistor 109 on and allow current pulses backwards from the Li-ion rechargeable battery to the fuel cell electrodes resulting in regeneration of the fuel cell 103. That is, the DC/DC converter 102 pulses current from the rechargeable battery backwards to the fuel cell 103, when the fuel cell voltage drops below the predetermined value. The boost DC/DC 102 converter will stop operating at certain minimum input voltage, e.g., 7V, and at this time the control circuit will activate the regeneration pulses for the fuel cell 103. After regeneration, the fuel cell voltage will recover and the boost converter will start charging the rechargeable battery 1 16 again. The low-voltage comparator 104 can be part of the boost DC/DC converter 104, but is shown separately for clarity.

The phenomena of catalyst reactivation in the fuel cell can be explained as follows: Certain types of fuel cells such as direct methanol fuel cells have a unique feature in that oxidation of methanol in the presence of a platinum/ruthenium (Pt/Ru) catalyst is a multi-step process. The overall reaction is:

$$CH_3OH + 3/2\ O_2 \rightarrow H2O + CO2\ \Delta G = -702\ kJ/mol$$

Pt is the electro-catalyst that provides most of the important intermediate steps in the electro-oxidation of methanol, allowing dissociation of the molecule by breaking C—H bonds during an adsorption step. However, this dissociation leads spontaneously to formation of CO, which poisons subsequent steps in the overall methanol reaction. The adsorbed CO can be oxidized at potentials at which oxygenated species are present at the electrode surface. The system thus requires high adsorption of OH (achieved by increasing Pt dispersion via smaller particles) or addition of a second metal more easily oxidized at lower potentials (Ru or others) to drive the methanol reaction to completion. Oxidation of CO on a Pt—Ru alloy electrode occurs 170-200 mV lower than on a pure Pt electrode, resulting in increased CO oxidation activity on Pt—Ru alloys. This leads to preferential adsorption of water on Ru atoms, producing Ru—OH and allowing CO to be adsorbed on the Pt atoms to oxidize the adjacent Ru—OH through the reactant pair mechanism:

CO poisoning is a slow but reversible process where CO can be oxidized to $CO_2$. CO contamination can be mitigated by several methods, such as by applying voltage pulses to the fuel cell to increase the anode potential to levels where CO is oxidized to $CO_2$. Experimental examples in the literature demonstrate the ability to recover cell voltage at a given current (thus boosting/recovering power capability) by applying anodic pulses to the fuel cell. Such a scheme should have a beneficial effect of improving power performance and extending the effective life of a fuel cell cartridge in a direct methanol fuel cell.

Fuel cells typically have a short delay between an "on" signal that begins the power generation process and the time at which desired operational power is obtained. For small systems (hydrogen or direct methanol oxidation fuel cells) this time is typically tens of seconds to several minutes. During this time, some power is obtained; however, there is a lag time to both achieve optimal mass transport of reactants and to heat the membrane electrode assembly (typically to some mild value above ambient; 30 to 40 C is typical) to improve conductivity and reactivity and achieve rated performance. The hybrid power supply 10 configuration allows initial power to be provided by the rechargeable battery 16, while the fuel cell 12 reaches its rated performance. Thereafter, the fuel cell delivers power to the DC/DC converter 14 causing charging the rechargeable battery 16 and delivery of power to the load 20.

Referring back to FIG. 1, one of the advantages of using a fuel cell in this manner is that the fuel cell 12 can be "instantly" refueled by exchanging a spent fuel cartridge 11 for a fresh one. This arrangement is in contrast to waiting for an AC outlet-based recharging of a rechargeable battery-powered consumer device. "Hot swap" is also envisioned, since the finite mass transport of reactants will allow a fuel cell to continue producing power even during a brief interruption of fuel delivery, such as when a fuel cartridge 11 runs dry/empty. This is the positive aspect of the "start-up" characteristics of fuel cells, that is the mass transport delay properties allows the cell to operate briefly after the fuel source is empty. However, to continue operating a device, it is necessary to quickly change the cartridge 11, otherwise the reactants will become consumed and the fuel cell depleted of sufficient fuel to continue. If a device user immediately sees the cartridge 11 "run dry" and immediately replaces it with a conveniently available one sitting next to the user, then hot swapping can be realized. However, if any of these conditions are not present, the device will power down before the hot swap can be achieved.

The hybrid power supply 10 configuration allows power to be provided by the rechargeable battery 16 while the fuel cartridge 11 is exchanged thus avoiding power down at least until the rechargeable cell 16 reaches its rated performance. Thereafter the fuel cell 12 delivers power to the DC/DC converter 14 causing recharging of the rechargeable battery 16 and delivery of power to the load 18.

For applications that can have relatively constant power requirements (DVD players, etc.), a hybrid power supply 10 configuration can provide substantial consumer benefit in a fuel cartridge interconnect 13. An example is described below. For a DVD player (assume 10 W device), "interconnect electronics" (e.g., a small rechargeable battery plus ASIC-based DC/DC converter 14 circuit) are configured in a compact arrangement (not shown) as part of the fuel cell system. The cartridge 11 has an interconnect 13 that allows the cartridge 11 to be easily replaced by a consumer (much like replacing a primary battery for instance). The interconnect allows fuel (hydrogen or methane for example) to be fed to the fuel cell and when the cartridge 11 is configured with such an interconnect provides an easy way to produce an "instant" recharge of the power supply 10.

A general feature of fuel cell/rechargeable battery hybrid power supply 10 is the ability to design the fuel cell to provide just above average power, and allow a rechargeable battery to provide peak power above that point (and to be slowly recharged during average power periods). This feature can be designed by providing rechargeable battery capacity sufficient to enable peak power to be handled by the combination of fuel cell and rechargeable battery.

For applications that can have a large difference between peak and average power (telecommunications, laptop computer, etc.), a hybrid power supply 10 configuration enables more cost effective and higher energy density power source than could be achieved by scaling a fuel cell to handle the peak power by itself. Benefits in an application such as powering of a laptop computer (assume average power 20 W, peak power 35 W) can be explained as follows:

Assuming a power density of 300 W/l for a rechargeable battery and 200 W/l for a direct methanol fuel cell, a 20 W power source with an 80 Wh fuel cartridge 11 would require 100 cc for fuel, 100 cc for the fuel cell, and 50 cc for a 15 W rechargeable battery (total volume=250 cc), and assume that the net runtime is 4 hours for average power and 2.5 hours peak. If the fuel cell were scaled to provide all the output power, it would require 175 cc for the fuel cell, leaving only 75 cc for the fuel. This would reduce runtime by 25%, and likely reduce it further because the fuel cell will change its operating point to respond to load changes. The hybrid power supply 10 configuration avoids these problems. The hybrid power supply 10 configuration allows the fuel cell to operate at peak fuel efficiency and allows the rechargeable battery handle load changes.

A number of embodiments of the invention have been described, other embodiments are within the scope of the following claims.

What is claimed is:

1. A hybrid voltage power supply that provides a fixed output voltage, the power supply, comprising:
   a switching type DC/DC boost type converter that receives energy from a fuel cell and is arranged to deliver the energy to a rechargeable cell, the DC/DC converter configured to provide substantially constant current drain from the fuel cell and a charging voltage that is less than a full charge voltage of the rechargeable cell; and
   a circuit disposed to sense voltage across the fuel cell to cause the rechargeable cell to supply a regeneration current to the fuel cell when the value of voltage of the fuel cell falls below a threshold value.

2. The hybrid power supply of claim 1, further comprising:
   a fuel cell interconnect, coupled to the fuel cell to permit a user to hot swap in a new fuel cartridge to supply fuel to the fuel cell while the fuel cell is delivering energy to the device.

3. The hybrid power supply of claim 1, further comprising:
   a circuit including a fuel cell current control that senses fuel cell current, and controls in part operation of the converter to provide the substantially constant current discharge from the fuel cell.

4. The hybrid power supply of claim 1, wherein the fuel cell is a direct-methanol fuel cell.

5. The hybrid power supply of claim 1, wherein the fuel cell is a hydrogen fuel cell.

6. The hybrid power supply of claim 1 wherein the DC/DC boost type converter further comprises:
   a pair of resistors coupled in series and having one end coupled to the output of the DC/DC boost type converter and with a common connection of the resistors coupled to a feedback input of the DC/DC boost type converter to adjust the fixed output voltage from the DC/DC boost type converter to be less than a full charge voltage of the rechargeable cell.

7. The hybrid power supply of claim 6 wherein the fuel cell control comprises:
   an operational amplifier and a fuel cell current sensing resistor to provide fuel cell current control with an output of the operational amplifier coupled to a common connection of the pair of resistors.

8. The hybrid power supply of claim 1 wherein the rechargeable battery is a Li-Ion or Li-Polymer rechargeable cell.

9. The hybrid power supply of claim 1 wherein the DC/DC converter delivers an output voltage that corresponds to about 90% charge of the rechargeable cell.

10. A hybrid constant voltage power supply comprising:
    a fuel cell;
    a switching type DC/DC boost type converter that receives energy from the fuel cell and is arranged to deliver the energy to a rechargeable cell, at a voltage that is less the full charge voltage of the rechargeable cell; and
    a fuel cell current sensor/comparator, included in a feedback control loop of the DC/DC converter, which controls in part operation of the converter to provide constant current discharge from the fuel cell; and
    a circuit disposed to sense voltage across the fuel cell to cause the rechargeable battery to supply a regeneration current to the fuel cell when the value of voltage of the fuel cell falls below a threshold value.

11. The hybrid power supply of claim 10, further comprising:
    a fuel cell current sensor/comparator that draws a constant current from the fuel cell to maximize fuel efficiency.

12. The hybrid power supply of claim 10 wherein the hybrid power supply is configured so that the fuel cell provides just above expected average power consumption for a particular application, and the rechargeable cell provides peak power requirements.

13. The hybrid power supply of claim 12 wherein the rechargeable cell is a Li-Ion or Li-Polymer rechargeable cell.

14. The hybrid power supply of claim 10 wherein the DC/DC boost type converter delivers an output voltage that corresponds to about 90% charge of the rechargeable cell.

15. A method comprising:
    delivering energy from a fuel cell to a rechargeable cell through a switching type DC/DC boost type converter at a fixed voltage that is less than a full charge voltage of the rechargeable cell with the DC/DC converter drawing a constant current from a fuel cell to allow the fuel cell to operate at maximum efficiency; and
    sensing voltage across the fuel cell to cause the rechargeable battery to supply a regeneration current to the fuel cell when the value of voltage of the fuel cell falls below a threshold value.

16. The method of claim 15, further comprising:
controlling a circuit that senses fuel cell current, and controls in part operation of the converter to provide a constant current discharge from the fuel cell; and
delivering energy from the rechargeable cell to a device.

17. The method of claim 15 further comprising
providing a fuel cell interconnect that permits a user to hot swap in a new fuel cartridge to supply fuel to the fuel cell while delivering energy to the device.

18. The method of claim 15 wherein the rechargeable cell is Li-Ion or Li-Polymer rechargeable cell.

19. The method of claim 15 wherein the circuit delivers an output voltage that corresponds to about 90% charge of the rechargeable cell.

* * * * *

UNITED STATES PATENT AND TRADEMARK OFFICE
CERTIFICATE OF CORRECTION

| | | |
|---|---|---|
| PATENT NO. | : 7,932,634 B2 | Page 1 of 1 |
| APPLICATION NO. | : 10/382106 | |
| DATED | : April 26, 2011 | |
| INVENTOR(S) | : Jordan T. Bourilkov | |

It is certified that error appears in the above-identified patent and that said Letters Patent is hereby corrected as shown below:

In column 12, claim 10, line 32, delete "less the" and insert --less than--, therefor.

In column 13, claim 17, line 6, after "comprising" insert --:--.

Signed and Sealed this
Twenty-first Day of June, 2011

David J. Kappos
*Director of the United States Patent and Trademark Office*